(12) United States Patent
Väre et al.

(10) Patent No.: US 7,162,253 B2
(45) Date of Patent: Jan. 9, 2007

(54) GEOGRAPHICAL POSITION EXTENSION IN MESSAGING FOR A TERMINAL NODE

(75) Inventors: Jani Väre, Turku (FI); Kari Virtanen, Turku (FI); Jari Syrjärinne, Tampere (FI); Janne Aaltonen, Turku (FI)

(73) Assignee: Nokia Corporation, Espoo (FI)

( * ) Notice: Subject to any disclaimer, the term of this patent is extended or adjusted under 35 U.S.C. 154(b) by 252 days.

(21) Appl. No.: 10/657,646

(22) Filed: Sep. 8, 2003

(65) Prior Publication Data

US 2005/0059409 A1 Mar. 17, 2005

(51) Int. Cl.
*H04Q 7/20* (2006.01)

(52) U.S. Cl. .............................. 455/456.2; 455/456.3; 455/456.1; 370/389; 370/400; 709/220; 709/238

(58) Field of Classification Search ............. 455/456.2, 455/456.3, 456.1; 370/400, 389; 709/220, 709/238
See application file for complete search history.

(56) References Cited

U.S. PATENT DOCUMENTS

| 6,157,621 | A * | 12/2000 | Brown et al. ................ 370/310 |
| 6,522,883 | B1 | 2/2003 | Titmuss et al. |
| 6,931,254 | B1 | 8/2005 | Egner et al. |
| 2002/0006133 | A1 * | 1/2002 | Kakemizu et al. .......... 370/401 |
| 2002/0154638 | A1 * | 10/2002 | Shahrier et al. ............. 370/400 |
| 2002/0155825 | A1 * | 10/2002 | Haumont et al. ............ 455/412 |
| 2003/0022676 | A1 | 1/2003 | Nakamoto et al. |
| 2003/0028763 | A1 | 2/2003 | Malinen et al. |
| 2003/0114981 | A1 | 6/2003 | Allen et al. |
| 2003/0143988 | A1 | 7/2003 | Jamadagni |
| 2004/0004967 | A1 * | 1/2004 | Nakatsugawa et al. ..... 370/400 |
| 2004/0092271 | A1 | 5/2004 | Viikari et al. |
| 2004/0120323 | A1 | 6/2004 | Vilkari et al. |
| 2004/0132465 | A1 | 7/2004 | Mattila et al. |
| 2004/0137888 | A1 * | 7/2004 | Ohki .......................... 455/417 |
| 2004/0141524 | A1 | 7/2004 | Lee et al. |
| 2004/0157619 | A1 * | 8/2004 | Corson et al. ........... 455/456.1 |
| 2004/0221154 | A1 * | 11/2004 | Aggarwal .................... 713/151 |

FOREIGN PATENT DOCUMENTS

EP 1261221 11/2002

OTHER PUBLICATIONS

Internet Protocol, Version 6 (IPv6) Specification, RFC 2460, *The Internet Engineering Task Force*, Dec. 1998.
International Search Report for PCT/IB04/02837 with written opinion.

* cited by examiner

*Primary Examiner*—Danh Cong Le
(74) *Attorney, Agent, or Firm*—Banner & Witcoff, Ltd.

(57) ABSTRACT

The present invention provides methods and apparatus for supporting geographical-based services in a communications system. In an embodiment of the invention, a terminal node (e.g., a wireless terminal) inserts geographical information into a header portion of an IPv6 datagram. The serving network utilizes the geographical information to support a geographical-based service. In another embodiment, a terminal node, which is located in a geographical area, receives service configuration information regarding service regions from a serving network and determines what services are supported in the geographical area. In an embodiment, header formats for the inserted geographical information in a propagated signal between a terminal node and a serving network are provided.

30 Claims, 12 Drawing Sheets

| Service name | coordinates | radius (m) |
|---|---|---|
| Service 1 | x,y,z | 1000 |
| Service 2 | x2,y2,z2 | 1500 |
| Service 3 | x3,y3,z3 | 2000 |
| Terminal Node | x4,y4,z4 | 3000 |

FIG. 11

GEOGRAPHICAL POSITION EXTENSION IN MESSAGING FOR A TERMINAL NODE

FIELD OF THE INVENTION

The present invention relates to supporting geographical-based services in a communications system for a terminal. In particular, the invention relates to apparatus and methods in which geographical information is inserted in messaging.

BACKGROUND OF THE INVENTION

Communication terminals are becoming increasingly portable while the supported services are becoming increasingly complex and diverse. Moreover, users require services that are based upon the location of the user. 911 emergency services is a ubiquitous example. Moreover, the number of geographical-based services is becoming more prevalent for non-emergency purposes. With mobile users carrying video-capable wireless terminals, for example, these users may wish to obtain information about restaurants in the local vicinity. By including the geographical position of the user's terminal with specific characteristics of the restaurant (e.g., type of cuisine and price range), a content server may provide a menu of a specific restaurant on the terminal's video display. The number of potential geographical-based services is staggering and is only limited by an entrepreneur's imagination.

With the prior art, geographical-based services are typically limited. For example, with Internet Protocol (IP) capable terminals, the location of a user is often predicated on the associated IP address. However, there may be a low correlation between the location and the value of the IP address, particularly if the IP address is static. Thus, deriving the location from the IP address may be very inaccurate. Also, with some wireless standards, such as Global System for Mobile Communications (GSM) and Universal Mobile Telecommunications System (UMTS), if a wireless terminal does have locating capabilities, position information may be included in signaling messages that are distinct from messages that contain associated data payloads.

Thus, there is a real need in the industry to provide methods and apparatuses for supporting geographical-based services that integrate geographical information with existing messaging and that is flexible. For example, geographical-based services should operate transparently even though the geographical-based services may be implemented on different platforms and architectures, including hybrid systems. Moreover, it is desirable that a communications system enables a user to select different options for geographical-based services if the communications system supports these options.

BRIEF SUMMARY OF THE INVENTION

An aspect of the present invention provides methods and apparatus for including geographical information in existing messaging. Thus, an existing message type that supports a data payload may also contain the geographical information in the same datagram. An embodiment of the invention supports a header extension that is compatible with IPv6 specifications, in which a geographical position, velocity information, and uncertainty information about the geographical position and the velocity information of a terminal node are contained in a destination options header or a hop-by-hop header. The terminal node connects with an attachment point, which passes datagrams to a content server through a router. The content server may use the geographical information to determine the geographical-based services that are available to the terminal node.

With another aspect of the invention, a destination position and a specified radius may be included in header information of a datagram from a terminal node. The destination position and radius are used for specifying an area, e.g., defined as a polygon having three or more corner points. The area, which may be expressed as a polygon, can be approximated as a circle. The serving network uses the geographical information to broadcast a geographical-based service to another terminal node through a Digital Video Broadcasting (DVB-T) network in an area defined by the geographical information.

With another aspect of the invention, a server parses geographical information in a header portion of a datagram and associates a determined position of a sending terminal node with the source address. The server selects services and/or announcements according to the position associated with the source address.

With another aspect of the invention, a terminal node receives service configuration information, e.g., an Electronic Service Guide (ESG), about services supported by a communications system in different service regions. The terminal node determines services that are supported in an area defined by the terminal node's geographical position and specified radius and correspondingly constructs a service filter.

With another aspect of the invention, header formats for the inserted geographical information in a propagated signal between a terminal node and a serving network are provided. The propagated signal contains at least one IPv6 datagram that supports the geographical-based service.

With another aspect of the invention, an attachment point inserts geographical information into a datagram if a terminal node has not included the geographical information.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 11 represents a service configuration that is associated with an Electronic Service Guide (ESG) of a communications system that supports geographical-based services in accordance with an embodiment of the invention.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
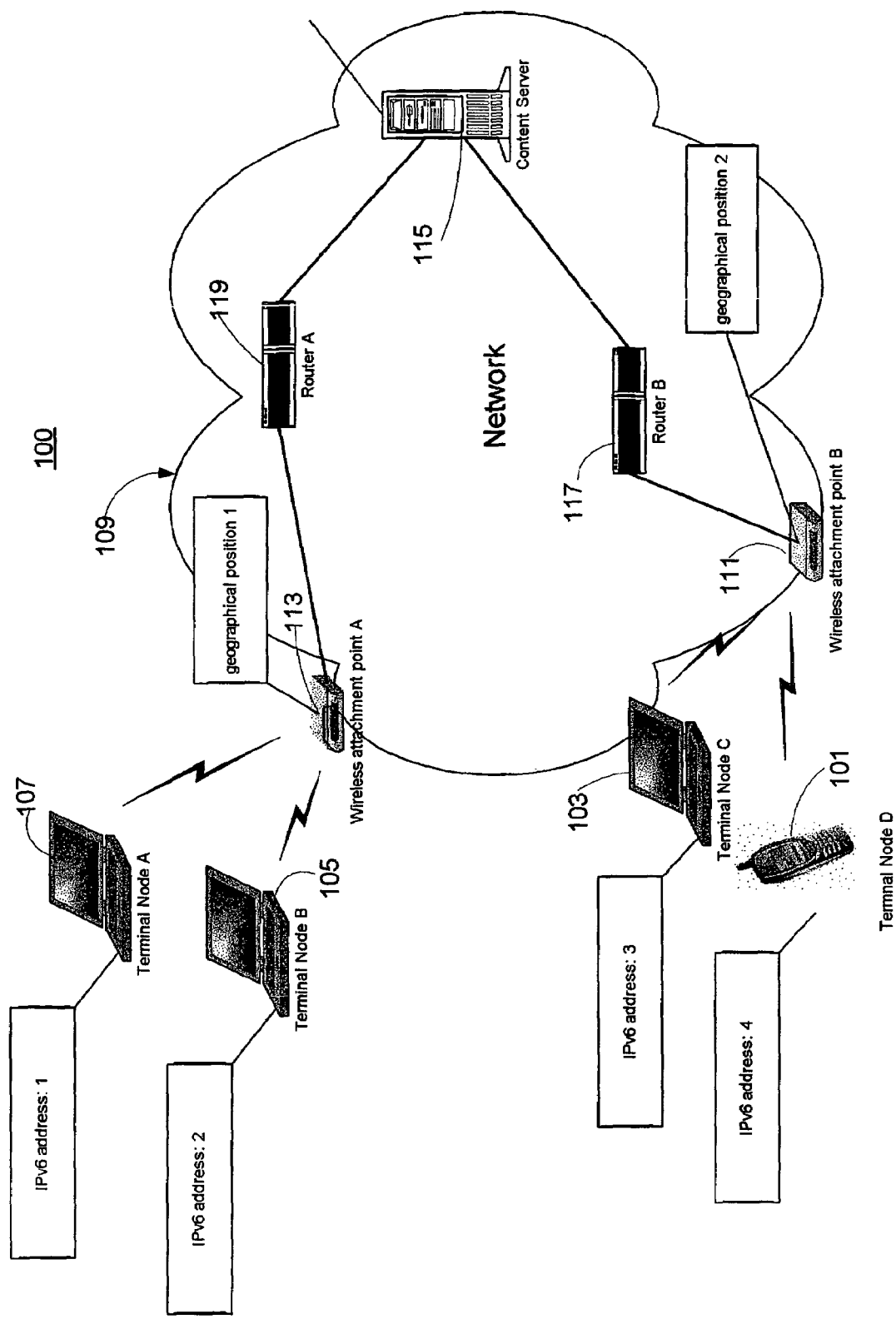
FIG. 1 shows an architecture of a communications system that supports a geographical-based service in accordance with an embodiment of the invention.

FIG. 1 shows an architecture of a communications system 100 that supports a geographical-based service in accordance with an embodiment of the invention. As an example, a terminal node 107 establishes a data connection to a wireless attachment point 113, which provides access for terminal node 107 to a network 109. Network 109 supports geographical-based services for terminal nodes 101–107. (Wireless attachment point 113 provides access for terminal nodes 105 and 107, while a wireless attachment point 111 provides access for terminal nodes 101 and 103.) Wireless attachment point 113 may be implemented in a number of ways, including a wireless local area network (WLAN) access point, a router, a hub, a bridge, a BlueTooth access point, and a base station of a wireless system. The base station may support different wireless standards, including General Packet Radio Service (GPRS) and Universal Mobile Telecommunications System (UMTS). A terminal node (e.g., terminal nodes 101–107) may correspond to different terminal types, including a mobile phone or a computer, such as a laptop or personal computer (PC) that may change location or that may be stationary. Also, the terminal node may interact with network through a communications channel, including a wireless communications channel, a dial-up telephone connection, and a cable connection.

In the exemplary embodiment, terminal node 107 comprises a mobile node that communicates to network 109 over a wireless communications channel. In the embodiment, terminal node 107 transmits and receives IPv6 datagrams that support a geographical-based service, although other embodiments of the invention may support datagrams with another format. The IPv6 datagrams are compatible with RFC 2460 (e.g., Internet Protocol, Version 6, December 1998). Moreover, the embodiment additionally utilizes an extension header to provide geographical information in the datagram. The geographical information includes a geographical position that is associated with terminal node 107. For example the geographical position may comprise the approximate location of terminal node 107. The geographical information may include other information such as a velocity of terminal node 107. The geographical information is explained in greater detail in the context of FIGS. 5 and 6. In the following discussion, a geographical extension header that contains geographical position data, e.g., as latitude, longitude, and altitude, is referred as a GPIPv6 header.

In the embodiment, datagrams from terminal node 107 are routed from wireless attachment point 113 through a router 119 to a content server 115. From the geographical position of terminal node 107, content server 115 determines what services can be supported for terminal node 107. For example, communications system 100 may be configured to support different services in different serving areas. In the exemplary embodiment shown in FIG. 1, terminal nodes 105 and 107 are approximately located at geographical position 1 and terminals 101 and 103 are approximately located at geographical position 2. (In the embodiment, the geographical position is provided by the terminal node. However, in other embodiments, the geographical position may be inserted by an entity of the serving network, e.g., attachment point 113.) Content server 115 parses the geographical position and associates a corresponding IPv6 source address with the geographical position. In addition, content server 115 associates services and/or announcements with the IPv6 address of terminal node 107. Table 1 illustrates an exemplary mapping of the IPv6 addresses of terminal nodes 101–107 to the corresponding geographical positions, services and announcements.

TABLE 1

| | Service Configuration | | |
|---|---|---|---|
| IPv6 address | Geographical position | Services | Announcements |
| 1 | 1 | Service set 1 | Set 1 |
| 2 | 1 | Service set 1 | Set 1 |
| 3 | 2 | Service set 2 | Set 2 |
| 4 | 2 | Service set 2 | Set 2 |

Figure 2:
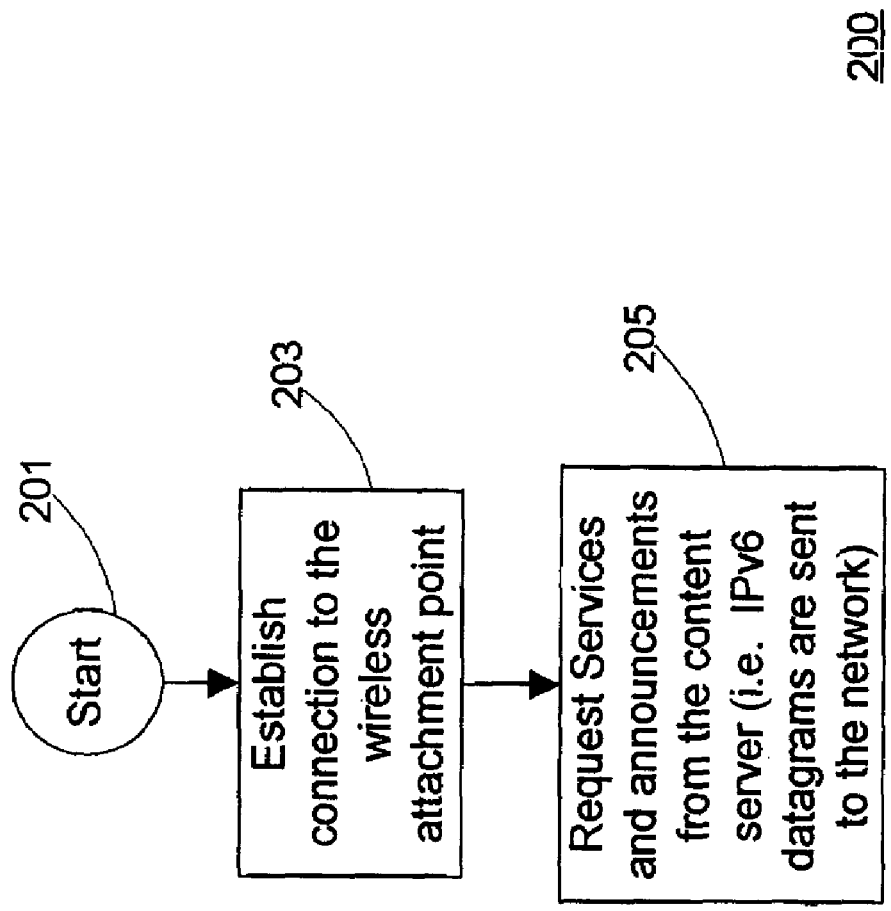
FIG. 2 shows a flow diagram for a terminal node, as shown in FIG. 1, in accordance with an embodiment of the invention.

FIG. 2 shows a flow diagram 200 for a terminal node (e.g., terminal node 107), as shown in FIG. 1, in accordance with an embodiment of the invention. Step 201 starts process 200. In step 203, terminal node 107 establishes a connection to attachment point 113. In step 205, a datagram that contains the geographical position of terminal node 107 is transmitted from terminal node 107 requesting for services and announcements from content server 115.

Figure 3:
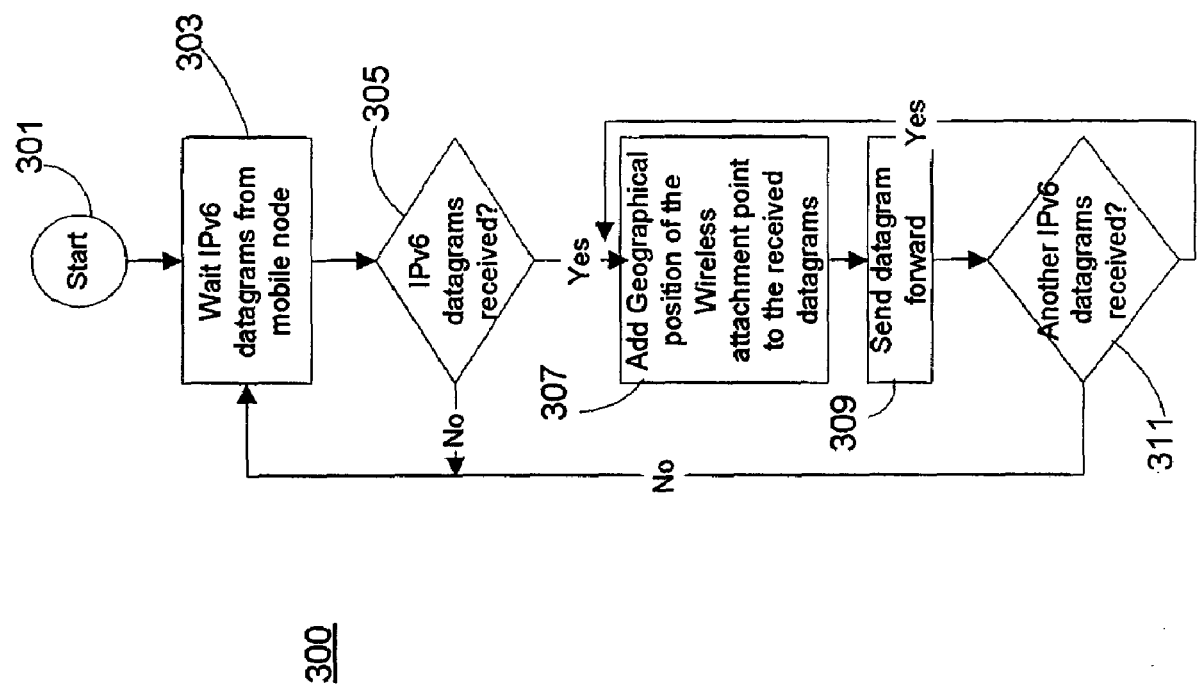
FIG. 3 shows a flow diagram for an access point, as shown in FIG. 1, in accordance with an embodiment of the invention.

FIG. 3 shows a flow diagram 300 for an access point (e.g., wireless attachment point 113), as shown in FIG. 1, in accordance with an embodiment of the invention. Step 301 starts process 300. In step 303, the access point waits for a datagram from terminal node 107. If a datagram is received from terminal node 107, as determined by step 305, wireless attachment point 113 determines if a geographical position has been inserted by terminal node 107. If not, wireless attachment point 113 inserts a geographical position that corresponds to the location of wireless attachment point 113 in step 307. In step 309, the datagram is forwarded to the content server, as designated in the destination address of the datagram, through router 119. Process 300 is repeated for the next received datagram in step 311.

Figure 4:
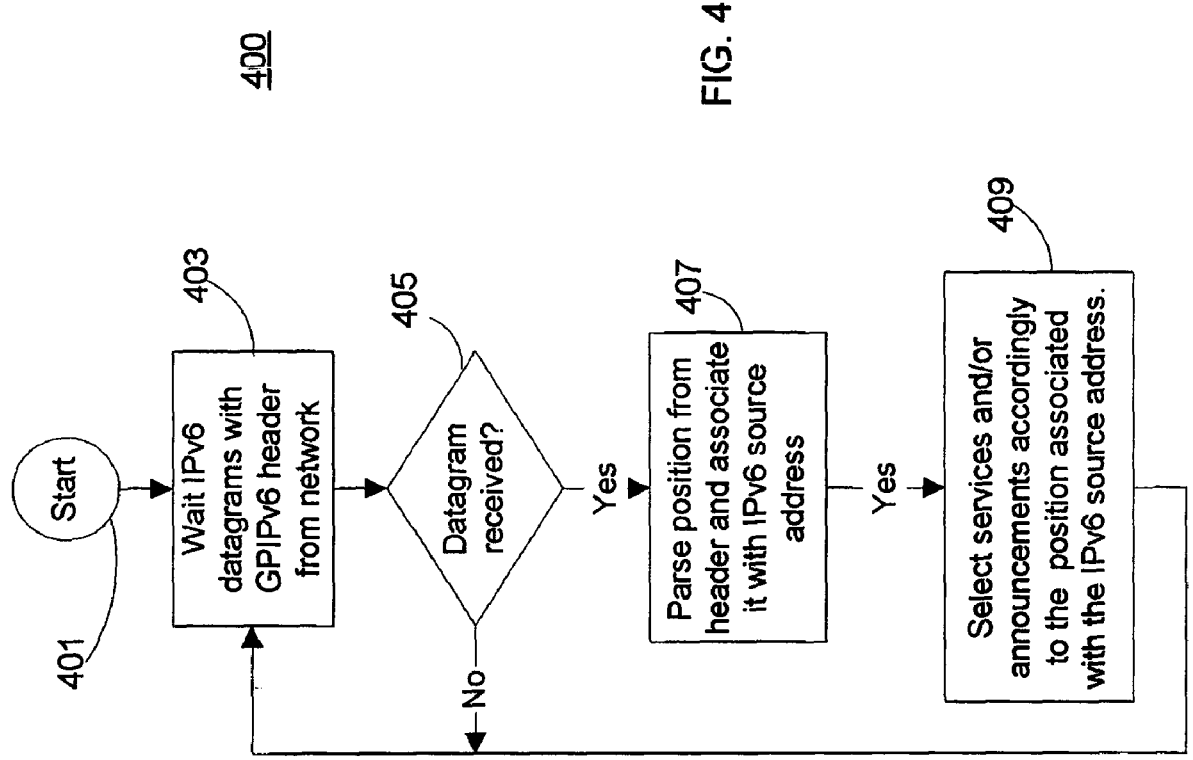
FIG. 4 shows a flow diagram for a content server, as shown in FIG. 1, in accordance with an embodiment of the invention.

FIG. 4 shows a flow diagram for a content server (e.g., content server 115), as shown in FIG. 1, in accordance with an embodiment of the invention. Step 401 starts process 400. In step 403, content server 115 waits for a datagram with a GPIPv6 header. If a datagram is received, as determined by step 405, content server 115 parses the geographical position data and associates the determined position with the IPv6 source address (that is contained in the IP datagram), which corresponds to terminal node 107 in step 407. In step 409, content server 115 associates available services and announcements that are available to terminal node 107 for the geographical position of terminal node 107 (as illustrated in Table 1).

Figure 5:
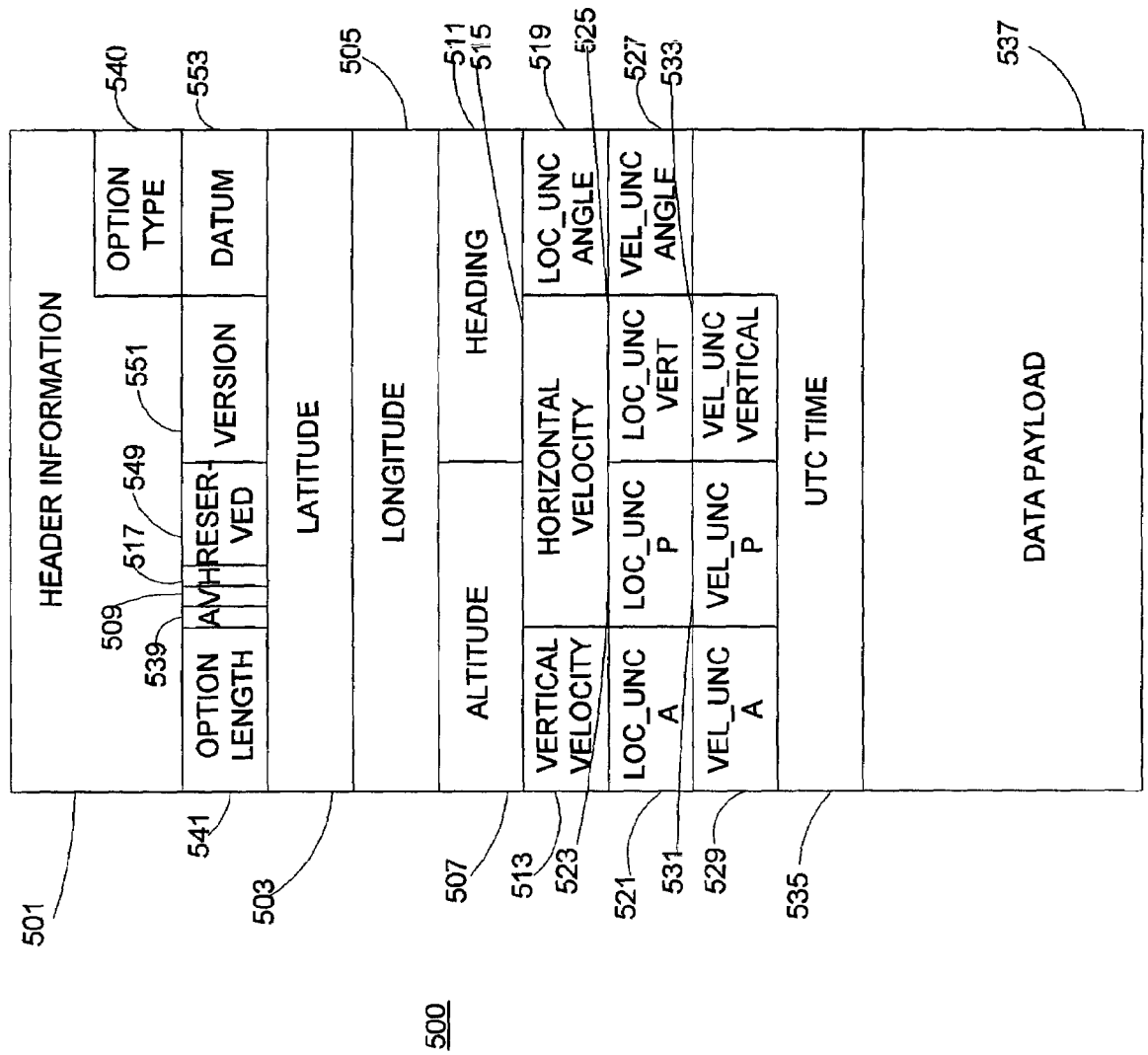
FIG. 5 shows a first layout of a message that supports a geographical-based service in accordance with an embodiment of the invention.

FIG. 5 shows a layout of a message 500 that supports a geographical-based service in accordance with an embodiment of the invention. Datagram 500 comprises header information 501 (such as the source IP address and the destination address) and data payload 537. Also, datagram 500 comprises geographical position information about a source device corresponding to a option type data field 540, an option length data field 541, a reserved data field 549, a version data field 551, a datum data field 553, a latitude data field 503, a longitude data field 505, an altitude data fields 507 and 539, velocity data fields 509, 511, 513, and 515, location uncertainty data fields 517, 519, 521, 523, and 525, velocity uncertainty data fields 527, 529, 531, and 533, and time data field 535.

Time data field 535 is a 40-bit field that contains the current time and data in Coordinated Universal Time (UTC) and Modified Julian Date (MJD). Field 535 is coded as 16 bits providing 16 LSBs of the MJD followed by 24 bits that represent 6 digits in a 4-bit Binary-Coded Decimal (BCD). In the exemplary embodiment, the geographical information is contained in a destination options header or in a hop-by-hop header, in compliance with RFC 2460. In the embodiment, a destination options header and a hop-by-hop header may be contained in the same datagram.

Referring to FIG. 5, the full width corresponds to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 551 is a 8-bit field that indicates the version of the message header. Datum data field 553 is a 8-bit field that indicates the used map datum (e.g., standard MIL-STD-2401) for determining the geographical position. Latitude data field 503 is a 32-bit field that indicates the latitude value of the source device (e.g., corresponding to an approximate location of terminal node 107) presented in ANSI/IEEE Std 754-1985 format. Longitude data field 505 is a 32-bit field that indicates the longitude value of the source device presented in ANSI/IEEE Std 754-1985 format. Alt indicator data field 539 is a 1-bit field indicating the use of altitude information. Altitude data field is a 16-bit field that indicates the altitude value of the source device presented in ANSI/IEEE Std 754-1985 format.

Velocity indicator data field 509 is a 1-bit field indicating the use of velocity information. If velocity information is included, this field is set to '1'. Otherwise this field is set to '0'. Heading data field 511 is a 16-bit field that indicates the direction where the mobile node is moving. If velocity indicator data field 509 is set to '0', this field is ignored. Otherwise, this field is included and is set to the angle of axis of horizontal velocity uncertainty, in units of 5.625 degrees, in the range from 0 to 84,375 degrees, where 0 degrees is True North and the angle increases toward the East. Vertical velocity data field 513 is an 8-bit field, which indicates the vertical velocity of the mobile node. Vertical velocity data field 513 is used if field 509 is set to '1'. Horizontal velocity data field 515 is a 16-bit field that indicates the horizontal velocity of the mobile node. If velocity indicator is set to '1', this field is in use. Once used, the horizontal speed is set in units of 0.25 m/s, in the range from 0 to 511.75 m/s. Otherwise this field is ignored.

Loc_Unc_H indicator data field 517 is a 1-bit field which indicates the horizontal position uncertainty, including elliptical. If elliptical horizontal position uncertainty information is included in this response element, this field is set to '1'. Otherwise, this field is set to '0'. Loc_Unc angle data field 519 (angle of axis of the standard error ellipse for horizontal position uncertainty) is a 8-bit field indicating the angle of axis of the standard error ellipse for horizontal position uncertainty. If Loc_Unc_H indicator field 517 is set to '0', this field is ignored. Otherwise, this field is included and is set to angle of axis for horizontal position uncertainty, in units of 5.625 degrees, in the range from 0 to 84.375 degrees, where 0 degrees is True North and the angle increases toward the East. Loc_Unc A data field 521 (standard deviation of error along angle specified for horizontal position uncertainty) is a 8-bit field indicating the Standard deviation of error along angle specified for horizontal position uncertainty. If Loc_Unc A data field 521 is set to '0', this field is ignored. Otherwise, this field is included and is set to represent the standard deviation of the horizontal position error along the axis corresponding to Loc_Unc angle data field 519. Loc_Unc P data field 523 (standard deviation of error along angle specified for horizontal position uncertainty) is a 8-bit field indicating standard deviation of error along angle specified for horizontal position uncertainty. If Loc_Unc P data field 523 is set to '0', this field is ignored. Otherwise, this field is included and is set to represent the standard deviation of the horizontal position error perpendicular to the axis corresponding to Loc_Unc angle data field 519. Loc_Unc vertical data field 525 (standard deviation of vertical error for position uncertainty) is a 8-bit field indicating standard deviation of vertical error for position uncertainty.

Vel_Unc angle data field 527 (angle of axis of standard error ellipse for horizontal velocity uncertainty) is a 8-bit field indicating the angle of axis of standard error ellipse for horizontal velocity uncertainty. If Vel_Unc angle data field 527 is set to '0', this field is ignored. Otherwise, this field is set to the angle of axis for horizontal velocity uncertainty, in units of 5.625 degrees, in the range from 0 to 84,375 degrees, where 0 degrees is True North and the angle increases toward the East. Vel_Unc A data field 529 (standard deviation of error along angle specified for horizontal velocity uncertainty is a 8-bit field indicating standard deviation of error along angle specified for horizontal velocity uncertainty. If velocity indicator data field 509 is set to '1', this field is included and is set to represent the standard deviation of the horizontal velocity error along the angle corresponding to Vel_Unc angle data field 527. Vel_Unc P data field data field 531 (standard deviation of error perpendicular to angle specified for horizontal velocity uncertainty) is a 8-bit field indicating standard deviation of error perpendicular to angle specified for horizontal velocity uncertainty. If velocity indicator data field 509 is set to '1', this field is included and is set to represent the standard deviation of the horizontal velocity error perpendicular to the angle corresponding to Vel_Unc angle data field 527. Otherwise, this field is ignored. Vel_Unc vertical data field 533 (standard deviation of vertical velocity error) is an 8-bit field indicating the standard deviation of vertical velocity error.

In the embodiment, location uncertainty data fields 519–525 may be used to define a geographical area, where the data of location uncertainty data fields may not be as specified by Standards, but can be used by an application for conveying region information. In such a case, the application could recognize the use of location uncertainty data fields 519–525 and/or the variation from the specification as indicated in some other field of the header.

Figure 6:
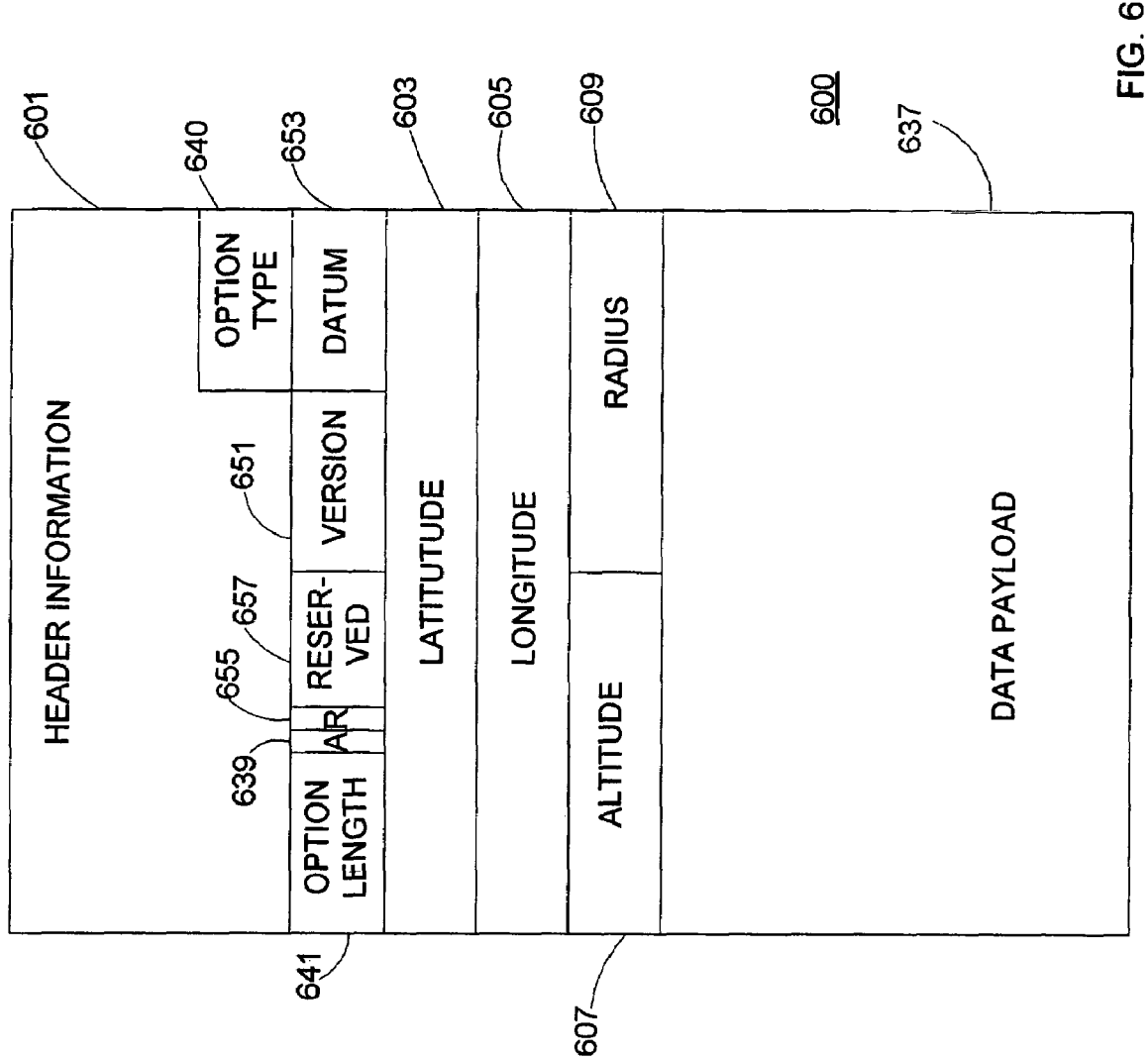
FIG. 6 shows a second layout of a message that supports a geographical-based service in accordance with an embodiment of the invention.

FIG. 6 shows a second layout of a message 600 that supports a geographical-based service in accordance with an embodiment of the invention. Datagram 600 comprises header information 601 (such as the source IP address and the destination address) and data payload 637. Also, datagram 600 comprises geographical position information about a destination position corresponding to a option type data field 640, an option length data field 641, a reserved data field 657, a version data field 651, a datum data field 653, a latitude data field 603, a longitude data field 605, an altitude data field 607, and radius fields 609 and 655. In the exemplary embodiment, the geographical information is contained in a destination options header or in a hop-by-hop header, in compliance with RFC 2460.

Referring to FIG. 6, the full width corresponds to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 651 is an 8-bit field that indicates the version of the message header. Datum data field 653 is a 8-bit field that indicates the used map datum (e.g., standard MIL-STD-2401) for determining the geographical position. Latitude data field 503 is a 32-bit field that indicates the latitude value of the destination position presented in ANSI/IEEE Std 754-1985 format. Longitude data field 505 is a 32-bit field that indicates the longitude value of the destination position presented in ANSI/IEEE Std 754-1985 format. Alt indicator data field 639 is a 1-bit field indicating the use of altitude information. Altitude data field is a 16-bit field that indicates the altitude value of the destination position presented in ANSI/IEEE Std 754-1985 format. Radius data field 609 is a 16-bit field that indicates the horizontal radius in meters from the destination position. Radius indicator data field is a 1-bit field that indicating the use of the radius information that is contained in radius data field 609. If set to '1', radius data field 609 is present.

With the embodiment, a separate message is not required to provide geographical information. An IPv6 datagram, shown in FIGS. 5 and 6, may carry both geographical information as well as a payload that is associated with a geographical-based feature. Combining these functions into the same datagram may facilitate processing the datagrams by a server that supports the geographical-based service. In a variation of the invention, header information in message 600 (corresponding to destination position) may be included in the same message as message 500 (corresponding to source position) in the same datagram. The header information may be supported in a IPv6 destination options header or in a IPv6 hop-by-hop header.

Figure 7:
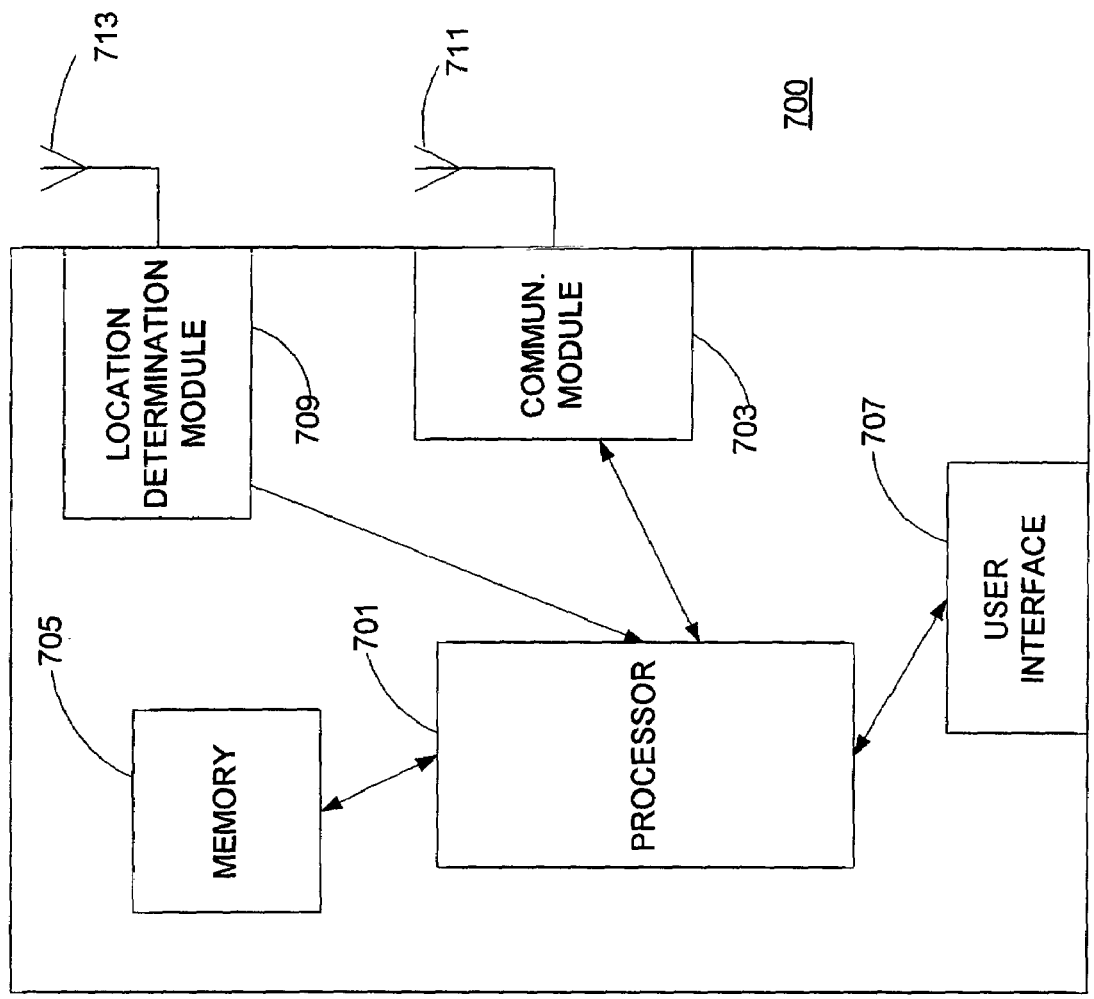
FIG. 7 shows an architecture for a terminal node that supports a geographical-based service in accordance with an embodiment of the invention.

FIG. 7 shows an architecture for a terminal node 700 that supports a geographical-based service in accordance with an embodiment of the invention. Terminal 700 comprises a processor 701, a communications module 703, a memory 705, a user interface 707, and a location determination module 709. Processor 701 executes computer instructions that are retrieved from memory 705. Also, processor 701 retrieves and saves data from/to memory 705.

Terminal node 700 (that may correspond to terminal node 107 as shown in FIG. 1) communicates with access point 113 (as shown in FIG. 1) through communications module 703. In the exemplary embodiment, communications module supports a wireless communications channel and transmits through an antenna 711. However, other embodiments of the invention may support other communications channels such as a dial-up telephone connection that do not necessitate antenna 711.

In the embodiment, terminal node 700 obtains geographical position information through location determination module 709. Location determination module comprises a Global Position Satellite (GPS) receiver in order to derive position information. Location determination module 709 receives radio signals through antenna 713 from a plurality of GPS satellites. From the gathered information, location determination module 709 derives an approximate position of terminal node 700.

Other embodiments of the invention may utilize other methods for determining a geographical position of terminal node 700, including assisted GPS, cell identification (corresponding to the location of the cell that terminal node is located), and time difference of arrival (TDOA). In some embodiments, antenna 713 may not be implemented because antenna may not be required to determine the geographical position of terminal node 700.

A user may provide commands and data to terminal node 700 through user interface 707. For example, the user may input an approximate set of position coordinates (e.g., latitude and longitude) rather than having location determination module 709 deriving the geographical position of terminal node 700. Also, if terminal node 700 receives a datagram from another terminal node, in which the datagram contains another geographical position of the other terminal node, the other geographical position may be displayed on user interface 707.

Figure 8:
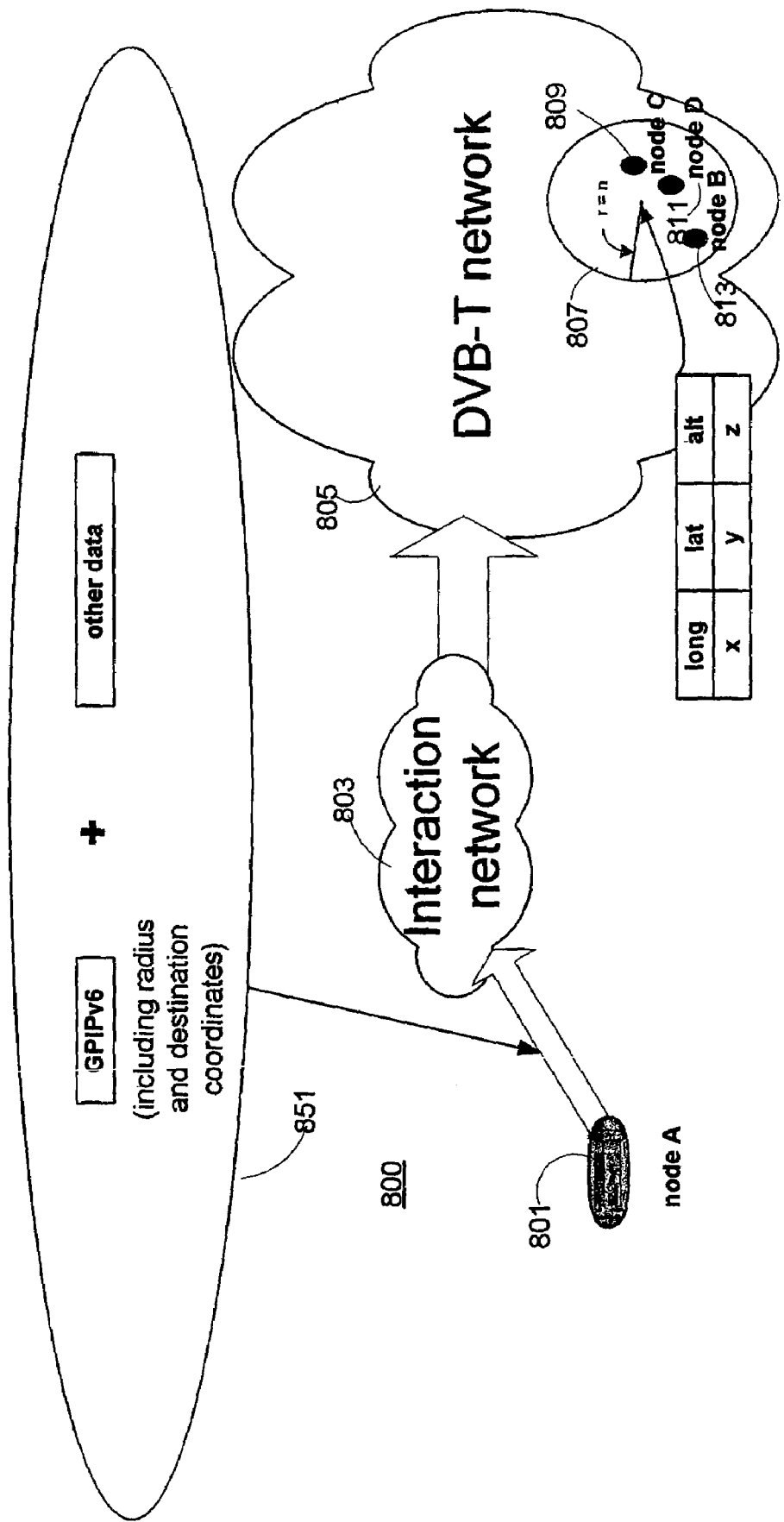
FIG. 8 shows an architecture of a network that supports a geographical-based service in conjunction with a DVB-T network in accordance with an embodiment of the invention.

FIG. 8 shows a network architecture 800 that supports a geographical-based service in conjunction with a Digital Video Broadcasting-Terrestrial (DVB-T) network 805 in accordance with an embodiment of the invention. A terminal node 801 is connected to an interaction network 803 (which may be supported by network 109 as shown in FIG. 1) through a wireless communications channel. To illustrate services that can be supported by network 800, a user (e.g., a restaurant) of terminal node 801 wishes to send a video message to other terminal nodes in the vicinity the restaurant in order to broadcast a special meal of the day. The broadcasting of the advertisement is supported by DVB-T network 805. DVB-T network 805 typically has unidirectional transmission capabilities to terminal nodes and typically is capable of supporting multicast services with massive data bandwidth for the downlink communications channel. DVB-T network 805 may not have an appreciable capacity of directly receiving messages from terminal nodes (corresponding to the uplink communications channel).

In the architecture shown in FIG. 8, terminal node 801 requests for the advertisement to be broadcast by DVB-T network 805 through interaction network 803. Terminal node 801 initiates the request by sending datagram 851, which includes a GPIPv6 header and other data, to interaction network 803. In the embodiment, interaction network 803 supports an interaction network protocol in order to interact with DVB-T network 805. Terminal node 801 specifies a region 807 over which the advertisement is to be broadcast. In the example shown in FIG. 8, terminal nodes 809–813 are within region 807 and thus terminal nodes 809–813 receive the advertisement when the advertisement is broadcast. Region 807, which is an approximate circle, is determined by a specified radius and a destination position that correspond to the approximate radius and center, respectively. (The destination position may correspond to the geographical position of terminal node 801 or may be a set of coordinates that is different from the geographical position of terminal node 801.) In order to specify the destination coordinates and the radius, terminal node 801 may send an IPv6 datagram that includes header information and a data payload (corresponding to the advertisement) as shown in FIG. 6.

Figure 9:
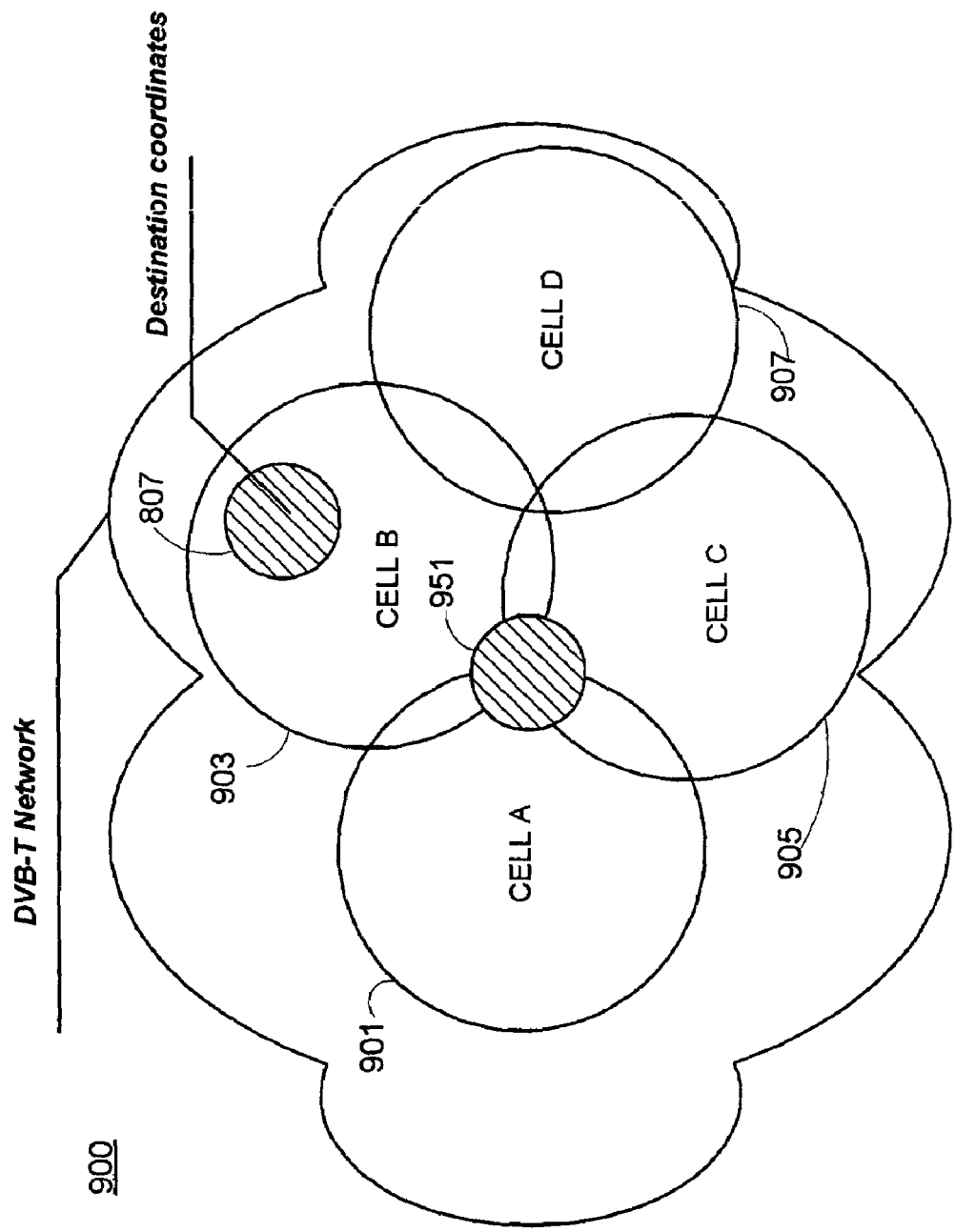
FIG. 9 shows a portion of a service area that is supported by the DVB-T network that is shown in FIG. 8.

FIG. 9 shows a portion of a service area 900 that is supported by the DVB-T network 805 that is shown in FIG. 8. Service area 900 is supported by cells 901–907. Region 807, as specified by terminal node 801, is contained entirely with cell 903. Thus, DVB-T network 805 broadcasts an advertisement from terminal node 801 over cell 903. Also, the embodiment supports a scenario in which a requested region spans a plurality of cells.

For example a requested region 951 spans cells 901–905. If terminal node 801 were to specify region 951 rather than region 807, the advertisement would be broadcast over cells 901–905.

Figure 10:
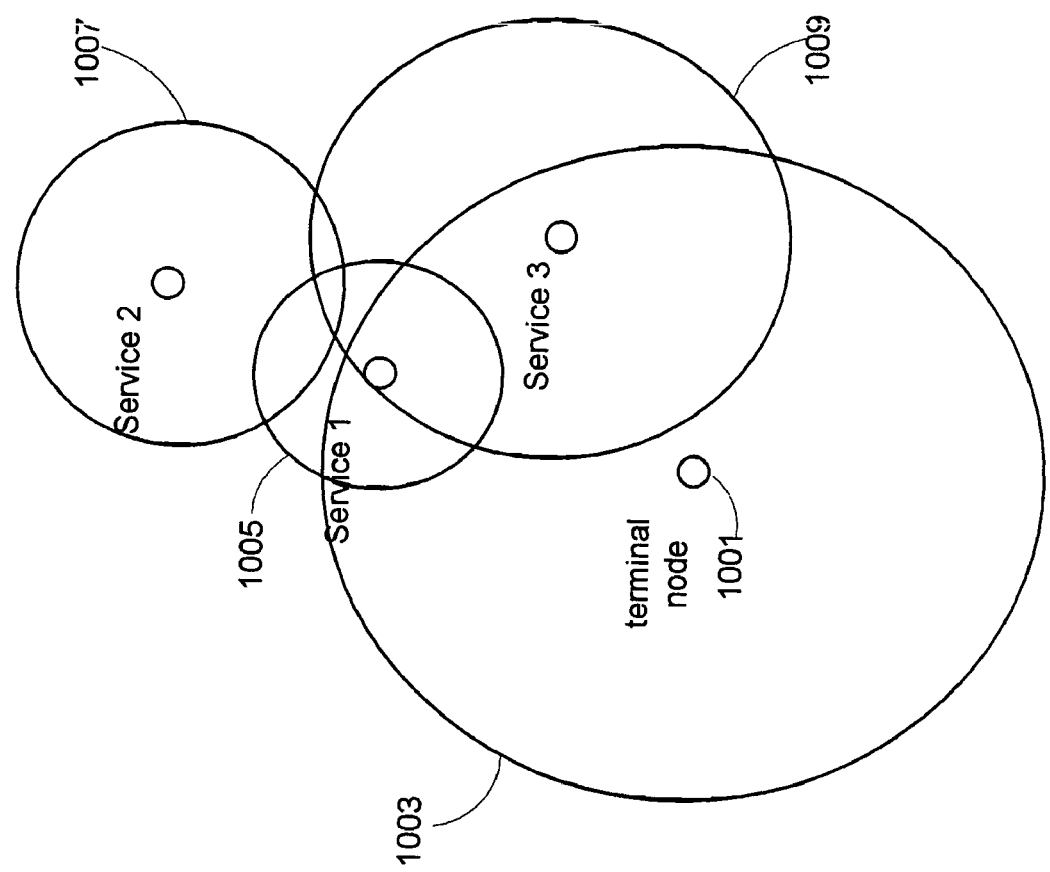
FIG. 10 shows serving regions for a terminal node corresponding to different geographical-based services and a range set by the terminal node within the communications system that is shown in FIG. 1.

FIG. 10 shows serving regions for different geographical-based services that communications system 100 can support a terminal node 1001 for the range set by terminal node 1001. In the example shown in FIG. 10, system 100 is configured to support different services in different regions. A service 1 is supported in region 1005; a service 2 is supported in region 1007; and a service 3 is supported in region 1009. System 100 may notify terminal node 1001 about the service configuration by sending an announcement that provides an Electronic Service Guide (ESG). (The ESG is discussed in more detail with FIG. 11.) Terminal node 1001 is configured to receive broadcasts over an approximate circular region 1003, in which the center corresponds to the position of terminal node 1001 and the radius is specified by the user of terminal node 1001 through a user interface (e.g., user interface 707 as shown in FIG. 7). In the exemplary embodiment, as shown in FIG. 10, terminal node 1001 is able to receiver services 1 and 3.

FIG. 11 represents a service configuration 1100 that is associated with a service guide (e.g., Electronic Service Guide (ESG)) of communications system 100 for supporting geographical-based services in accordance with an embodiment of the invention. Service configuration 1100 corresponds to the service configuration that is shown in FIG. 10. Each geographical-based service is supported over an approximate circular region that is specified by center coordinates 1103 and radius 1105. Service 1107 (service 1) has center coordinates 1113 and radius 1115. Service 1109 (service 2) has center coordinates 1117 and radius 1119. Service 1111 (service 3) has center coordinates 1121 and radius 1123. Terminal node 1001 is located at center coordinates 1127 and specifies radius 1129 for services. With the corresponding geometry, terminal node 1001 determines what services are available at its current location. Of course, if terminal node 1001 changes locations, a different set of services may be available and thus are recalculated.

Figure 12:
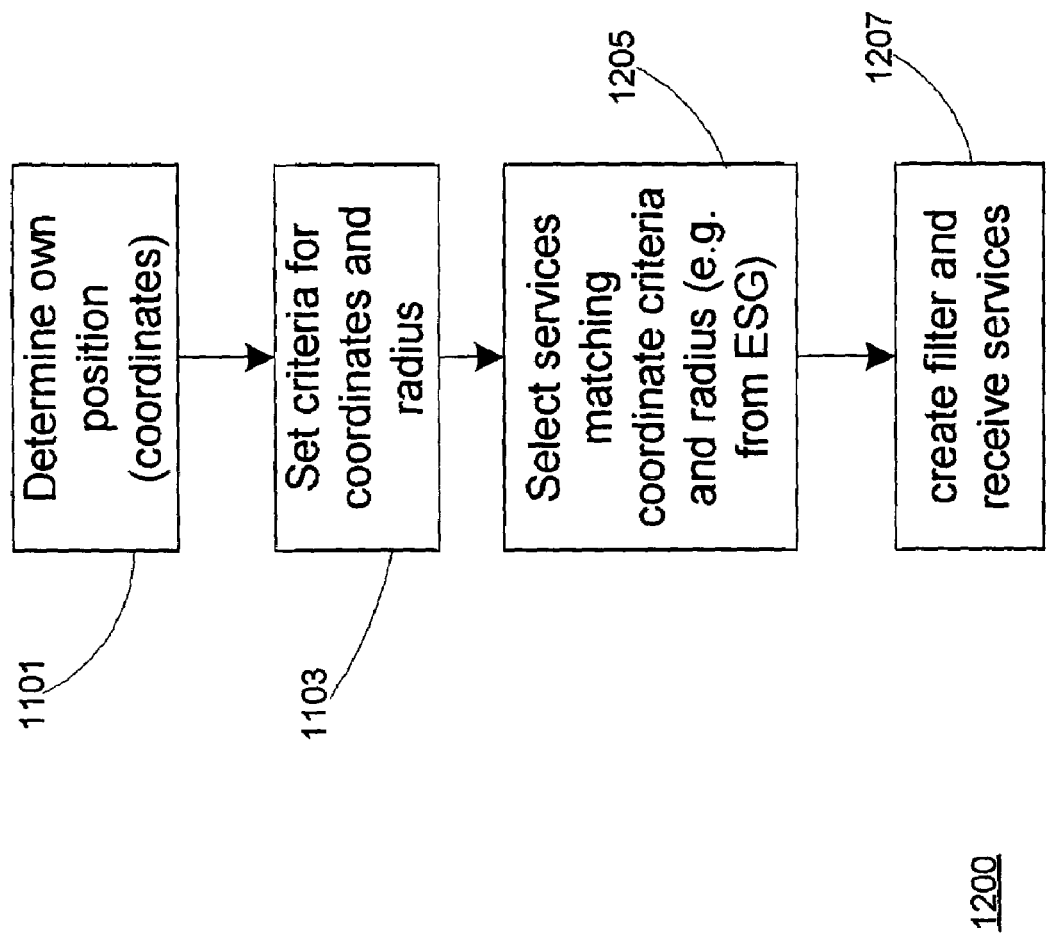
FIG. 12 shows a flow diagram for the terminal node, as shown in FIG. 10, in accordance with an embodiment of the invention.

FIG. 12 shows a flow diagram 1200 for the terminal node 1001 for determining available services in accordance with an embodiment of the invention. If a service is available and if the user wishes to utilize the service, the service is configured in a filter. The filter processes datagrams that are associated with the selected services. In step 1101, terminal node 1001 determines its position coordinates, utilizing location determination module 709 (as shown in FIG. 7). In step 1103, terminal node 1001 sets criteria for determining available services by utilizing center coordinates 1127 and radius 1129. In step 1205, using the service configuration broadcast by system 1000 in an announcement, terminal node 1101 selects services that match coordinate and radius criteria. In the example shown in FIG. 10, terminal node 1001 correspondingly selects service 1107 (service 1) and service 1111 (service 3). In step 1207, terminal 1001 configures a message filter, in which datagrams corresponding to service 1107 and service 1111 are processed.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for supporting a geographical-based service for at least one terminal node in a communications system, the method comprising:
   (a) determining a first geographical position that is associated with a first terminal node;
   (b) inserting the first geographical position and a specified radius into a message header of a first datagram, the specified radius being indicative of a serving area for the geographical-based service;
   (c) sending, by the first terminal node, the first datagram;
   (d) receiving, by another terminal node, the first datagram;
   (e) determining another geographical position, the other geographical position being associated with the other terminal node; and
   (f) if the other terminal node is within an approximate circular area, accepting the first datagram, wherein the approximate circular area is specified by the specified radius in relation to the first geographical position.

2. The method of claim 1, wherein the first geographical position is indicative of an approximate location of the first terminal node.

3. The method of claim 1, wherein the first geographical position in indicative of an approximate destination position.

4. The method of claim 1, wherein (a) comprises:
   (i) acquiring the geographical position by the terminal node with a Global Position Satellite (GPS) location determination module.

5. The method of claim 1, wherein (a) comprises:
   (i) obtaining the first geographical position from a serving network.

6. The method of claim 1, wherein (a) comprises:
   (i) obtaining the first geographical position through a user interface.

7. The method of claim 1, wherein (a) comprises:
   (i) acquiring the geographical position by utilizing a time difference of arrival (TDOA) technique.

8. The method of claim 1, wherein (b) comprises:
   (i) selecting a selected datagram; and
   (ii) inserting the geographical position into a message header of the selected datagram.

9. The method of claim 1, further comprising:
(g) inserting an indicator into the first datagram, wherein the indicator restricts processing of the first geographical position by another entity of the communications system.

10. The method of claim 1, wherein the datagram complies with an Internet Protocol version 6 (IPv6) specification and wherein (b) comprises inserting the first geographical location into an extension header of the first datagram.

11. The method of claim 10, wherein the extension header comprises a destination option header.

12. The method of claim 10, wherein the extension header comprises a hop-by-hop header.

13. The method of claim 1, wherein the communications system comprises a wireless system and the first terminal node comprises a mobile node.

14. The method of claim 1, wherein the first terminal node is selected from the group consisting of a wireless telephone, a workstation, a personal computer (PC), and a stationary communications device.

15. The method of claim 1, wherein (a) comprises:
(i) selecting a technique for determining the first geographical position.

16. The method of claim 15, further comprising:
(g) inserting a technique identification into the message header of the first datagram, the technique identification identifying the selected technique for determining the first geographical position.

17. The method of claim 1, wherein the first geographical position comprises an approximate longitude and an approximate latitude of a position of the terminal node.

18. The method of claim 1, further comprising:
(g) displaying, by the other terminal node, information that is indicative of the first geographical position.

19. The method of claim 1, wherein the first datagram is contained in a stream of datagrams.

20. The method of claim 1, further comprising:
(g) inserting an indicator into the first datagram, wherein the indicator restricts processing of the first geographical position and a destination location by another entity of the communications system.

21. A computer-readable medium having computer-executable instructions for supporting a geographical-based service for at least one terminal node in a communications system performing the steps of:
(a) determining a first geographical position that is associated with a first terminal node;
(b) inserting the first geographical position and a specified radius into a message header of a first datagram, the specified radius being indicative of a serving area for the geographical-based service;
(c) sending, by the first terminal node, the first datagram;
(d) receiving, by another terminal node, the first datagram;
(e) determining another geographical position, the other geographical position being associated with the other terminal node; and
(f) if the other terminal node is within an approximate circular area, accepting the first datagram, wherein the approximate circular area is specified by the specified radius in relation to the first geographical position.

22. The computer-readable medium of claim 21, further having instructions for performing the step of:
(g) inserting an indicator into the first datagram, wherein the indicator restricts processing of the first geographical position by another entity of the communications system.

23. A method for supporting at least one geographical-based service, the method comprising:
(a) determining a geographical position that is indicative of an approximate location of a mobile node;
(b) determining a specified radius, the specified radius being a maximum distance from the geographical position;
(c) receiving an announcement, the announcement containing an identification of a service, a service geographical position, and a service radius, the service geographical position and the service radius being associated with a network entity supporting the service;
(d) determining whether a service area corresponding to the service geographical position and the service radius is within a circular area, the circular area being determined by the geographical position and the specified radius;
(e) if the service area is within the circular area, including the identification of the service in a filter to designate that the service is acceptable;
(f) receiving a datagram that supports the service;
(g) if the service is acceptable, accepting the datagram; and
(h) if the service is not acceptable, rejecting the datagram.

24. The method of claim 23, further comprising:
(i) detecting that the mobile node has moved to another geographical position;
(j) in response to (i), determining if the service is acceptable; and
(k) modifying the filter in accordance with (j). 2 .

25. The method of claim 23, wherein (a) comprises:
(i) acquiring the geographical position by the terminal node with a Global Position Satellite (GPS) location determination module.

26. The method of claim 23, wherein (a) comprises:
(i) obtaining the geographical position from a serving network.

27. The method of claim 23, wherein (a) comprises:
(i) obtaining the geographical position through a user interface.

28. The method of claim 23, wherein (a) comprises:
(i) acquiring the geographical position by utilizing a time difference of arrival (TDOA) technique.

29. The method of claim 23, wherein (a) comprises:
(i) selecting a technique for determining the geographical position.

30. The method of claim 23, wherein the geographical position comprises an approximate longitude and an approximate latitude of a position of the mobile node.

* * * * *